June 11, 1957 R. A. COLEMAN ET AL 2,795,253
VEGETABLE PEELING MACHINE
Filed April 4, 1955 2 Sheets-Sheet 1

INVENTORS
Richard A. Coleman
and
Lawrence H. Long,
BY
ATTORNEY

June 11, 1957  R. A. COLEMAN ET AL  2,795,253
VEGETABLE PEELING MACHINE
Filed April 4, 1955  2 Sheets-Sheet 2
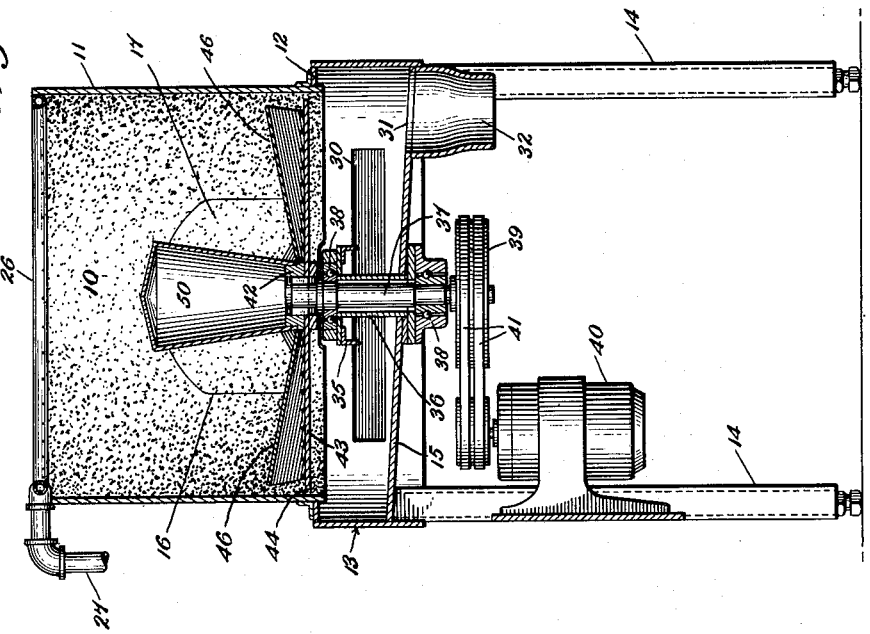
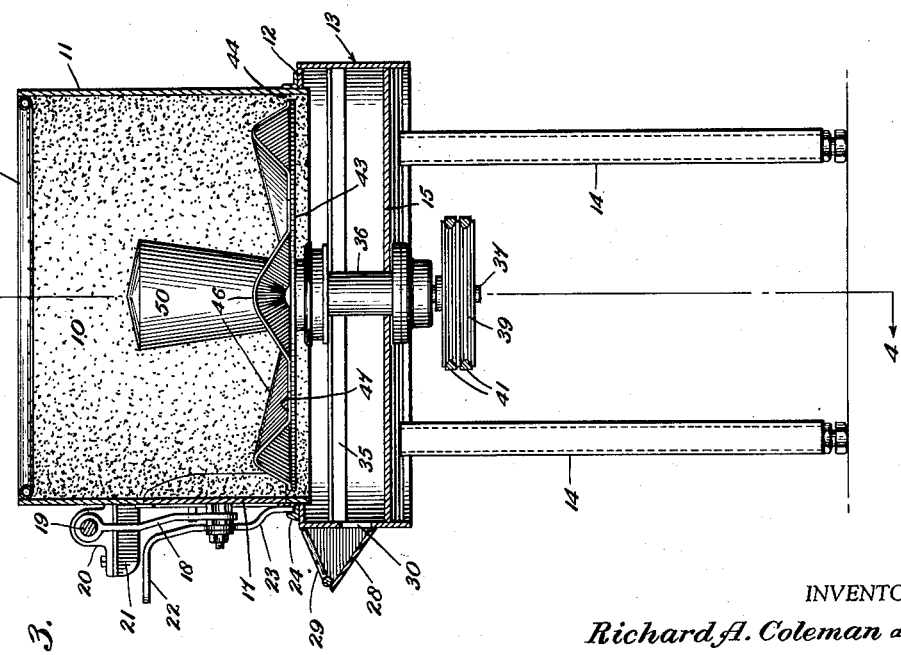
INVENTORS
*Richard A. Coleman* and
*Lawrence H. Long,*
BY
ATTORNEY

United States Patent Office 2,795,253
Patented June 11, 1957

2,795,253
VEGETABLE PEELING MACHINE

Richard A. Coleman and Lawrence H. Long, Harrisburg, Pa., assignors to J. D. Ferry Co., Inc., Harrisburg, Pa., a corporation of Pennsylvania Application April 4, 1955, Serial No. 498,825

2 Claims. (Cl. 146—49)

This invention relates to machines for peeling potatoes and the like, and has for its principal object the provision of an improved apparatus of this character which will function more rapidly and efficiently than those which have been heretofore proposed.

The present day commercial production of vegetable products such as potato chips, French fries and the like, calls for the peeling of large quantities of the vegetables, and various machines for effecting such operation have been devised, at least some of which are in more or less extensive use. Perhaps the most successful of these has been the type in which an upright open-ended cylindrical housing surmounts a receptacle for the peelings and has a horizontal plate or table rotatably mounted in its lower portion, upon which the vegetables are deposited and rest. Such plate is of somewhat smaller diameter than the housing and usually is formed to present a plurality of upwardly facing elevations and/or depressions; and in addition its upward face, as well as the peripheral wall of the housing, are roughened to provide abrading surfaces.

When a batch of vegetables is deposited in the chamber provided by the cylindrical housing to rest upon the plate, upon rapid rotation of the latter the elevations and/or depressions thereof impart agitation and circulatory movement to the components of the vegetable mass whereby through the attritive action of the roughened surfaces of the plate and housing on the surfaces of the vegetables the skins or peels of the latter are loosened and removed. Usually means are provided whereby flushing water may be supplied to the chamber, which water along with the peelings escapes through the annular space between the plate periphery and the housing wall to the peelings receptacle below the plate, and from there is discharged to waste. The peripheral wall of the housing is provided with a door which, when opened at the conclusion of a peeling operation, permits of discharge of the peeled vegetables from the peeling chamber.

While apparatus of the character just described functions fairly well, we have found that the efficiency thereof may be appreciably increased and the time necessary to effect acceptable peeling of a batch of vegetables may be materially reduced if means be provided in the peeling chamber whereby to induce or maintain better contact between the vegetable components and the abrasive surface of the chamber wall. One mode of effecting this is illustrated in the accompanying drawings constituting a part of this specification, in which like reference characters designate like parts throughout the views, and in which:

Fig. 3 is a vertical sectional view of the machine, taken approximately on the plane indicated by the line 3—3 of Fig. 2, looking in the direction of the arrows; and Fig. 4 is a view similar to Fig. 3, taken on approximately the plane indicated by the line 4—4 in the latter figure.

Figure 1:
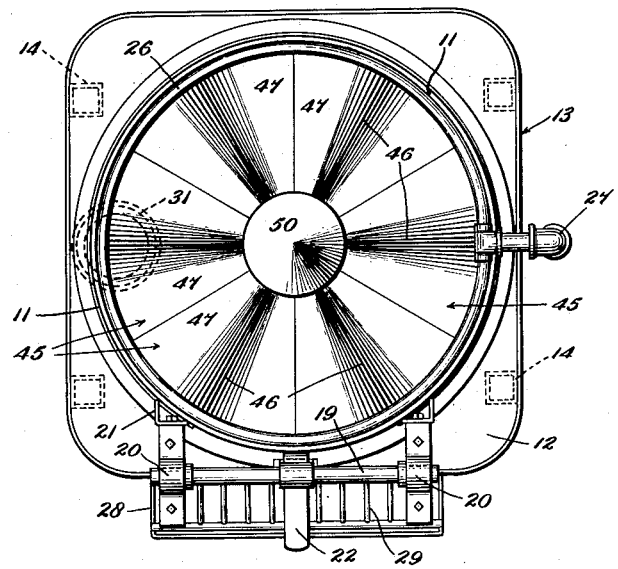
Figure 1 is a top plan view of a peeling machine embodying the invention.
Figure 2:
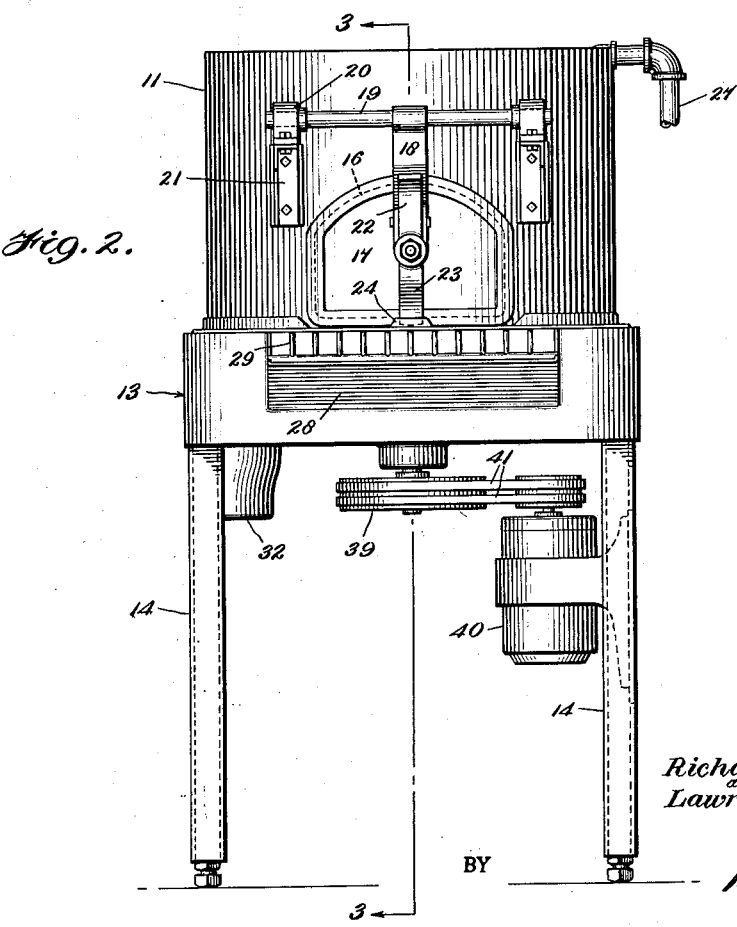
Fig. 2 is a front elevational view thereof.

Referring to the said drawings in greater detail, the peeling machine there shown comprises a peeling chamber 10 provided by an upright open-ended cylindrical member 11, the inner peripheral surface of which is roughened in any appropriate manner, as by having Carborundum or analogous abrasive material incorporated therein or cemented thereto. The lower end portion of the member is disposed in a circular opening in the top wall 12 of a peelings receptacle 13, which is supported by legs 14 and provided with a sloping bottom wall 15, as clearly shown in Fig. 4. The wall of the cylinder 11 is provided with a lateral discharge opening 16 which is normally closed by a door 17 supported by a strap 18 that is carried by a shaft 19 which is journaled in bearings 20 mounted on brackets 21 that are rigidly attached to the said cylinder wall. The door 17 carries a swingable latch member 22, the lower arm 23 of which is arranged for engagement with a lug 24 carried by the cylinder member 11, whereby the door may be effectively retained in closed position during a peeling operation, yet easily released and moved to an open position at the conclusion thereof to permit discharge of the peeled vegetables from the chamber 10. A perforated annular spray pipe 26 is mounted in the upper portion of the chamber 10, and is connected to a water supply pipe 27 whereby flushing water may be introduced into the chamber during a peeling operation.

As here shown the peelings receptacle 13 is of substantially square conformation in plan, and along that side thereof underlying the discharge opening 16 of the chamber there is provided an elongated external trough 28 which is adapted to receive any water, peelings or other foreign matter which may be discharged with the vegetables when the door 17 is opened. The open upper side of said trough is provided with a grating 29 which prevents the vegetables from entering the trough, while the refuse which may be received therein is discharged into the receptacle 13 through a port 30 provided in the perimetral wall of said receptacle. The inclined bottom wall 15 of the receptacle is provided with a drain opening 31 at its lower side, which opening communicates with a nipple 32 which may be connected to a sewer or other means of waste disposal.

A pair of horizontal angle-iron supporting members 35 extend across the receptacle 13, to which members is secured the upper end portion of a vertically extending shaft and bearing housing structure 36, the lower portion of which extends through and is secured to the inclined bottom wall 15 of the peelings receptacle. A shaft 37 is journaled within said structure by means of bearings 38, and at its lower end carries a pulley 39 adapted to be driven by a motor 40 through the medium of belts 41. At its upper end the said shaft has removably keyed to it the hub element 42 of a disc or plate 43, which is thus rotatably supported in the lower portion of the cylindrical member 11. The diameter of said disc is slightly less than that of the member 11, thereby providing an annular space 44 between the disc periphery and the member wall through which the peelings and wash water may escape to the receptacle 13.

As here shown, a plurality of segmental sheet-metal elements 45 are disposed upon and secured to the upper face of the disc 43, each of which elements is stamped or otherwise formed to provide a medial inverted V-shaped ridge 46 flanked on either side by a planar portion 47. When these elements are assembled on the disc as shown in Figs. 1, 3 and 4, the several ridges 46 extend substantially radially from the disc axis, and they progressively increase in both depth and width outwardly from said axis to the circumference. When the disc structure is rapidly rotated beneath a batch of vegetables deposited in the chamber 10 the undulations provided by the alternate ridges 46 and planar portions 47 impart vertical and some rotary movements to the components of the batch thus producing agitation and circulation thereof during which their contact with the abraiding surface of the chamber wall loosens and removes the skins or peels of the vegetables. Since water is being sprayed into the chamber from the pipe 26 during this operation, the peelings are continuously flushed through the annular opening 44 into the receptacle 13 from which they are discharged through opening 31 to the drain or other waste disposal means. When peeling is completed the latch 22 is released, the door 17 opened and the peeled vegetables discharged through the opening 16, passing over the grating 29 where any foreign matter accompanying them passes into the trough 28 and through port 30 to the receptacle 13.

As previously indicated, we have found that the peeling operation may be appreciably speeded up if means be provided for insuring better contact between the vegetables and the abrading wall surface of the chamber 10. To this end an inverted frusto-conical member 50 is secured to the hub element of the disc structure, which member is of a length to extend upwardly in the chamber 10 at least half way to the top thereof. As a result of the provision of this member, which provides an upwardly convergent space between it and the chamber wall, when the components of the vegetable mass are impelled upwardly by the undulations of the disc structure 43, 45 they are deflected outwardly by the coniform member into intimate engagement with the abrading surface of the chamber wall, whereby the time necessary to attain satisfactory removal of the vegetable skins is appreciably shortened. The action of the member 50 also tends to prevent the vegetables from being thrown out of the chamber 10 through the open top thereof.

The conicity of the member 50 need not be great; in the example shown the side wall of the cone makes an angle on the order of 7° to 10° with the axis. It may also be noted that roughening of the upper face of the disc structure is not necessary, although of course it may be done if desired.

What is claimed is:

1. In a machine for peeling vegetables, the combination of means providing an upright cylindrical vegetable-receiving chamber having a perimetral abrading surface; undulatory disc means rotatably disposed in the lower portion of said chamber for imparting agitational and circulatory movements to vegetables therein, relative to said abrading surface; and an inverted coniform member carried by said disc means and extending upwardly in the chamber axially thereof, said member being engageable by the vegetables during their said movements whereby to insure good attritive contact thereof with the abrading surface.

2. In a machine for peeling vegetables, the combination of a vertical-walled cylindrical member providing an upright vegetable-receiving chamber having a perimetral abrading surface; rotatable means in the lower portion of said chamber arranged to impart upward agitational and circulatory movements to vegetables therein relative to said abrading surface; and means for enhancing the attritive contact between the vegetables and such surface during said movements, comprising a member disposed in said chamber above said rotatable means and having a vegetable-engageable wall extending upwardly therefrom to approximately the midportion of the chamber in an upwardly divergent relation to the chamber axis and an upwardly convergent relation to said perimetral abrading surface.

References Cited in the file of this patent
UNITED STATES PATENTS

| | | |
|---|---|---|
| 809,582 | Robinson | Jan. 9, 1906 |
| 1,902,506 | Johnston et al. | Mar. 21, 1933 |
| 1,982,339 | Ehrenfeld | Nov. 27, 1934 |
| 2,228,057 | Kirby | Jan. 7, 1941 |
| 2,514,493 | Hetherington | July 11, 1950 |
| 2,748,819 | Mayer | June 5, 1956 |

FOREIGN PATENTS

| | | |
|---|---|---|
| 493,625 | Germany | Mar. 10, 1930 |
| 831,783 | Germany | Feb. 18, 1952 |